No. 862,936. PATENTED AUG. 13, 1907.
H. J. PHILLIPS.
BICYCLE ATTACHMENT.
APPLICATION FILED JULY 14, 1905.
2 SHEETS—SHEET 2.
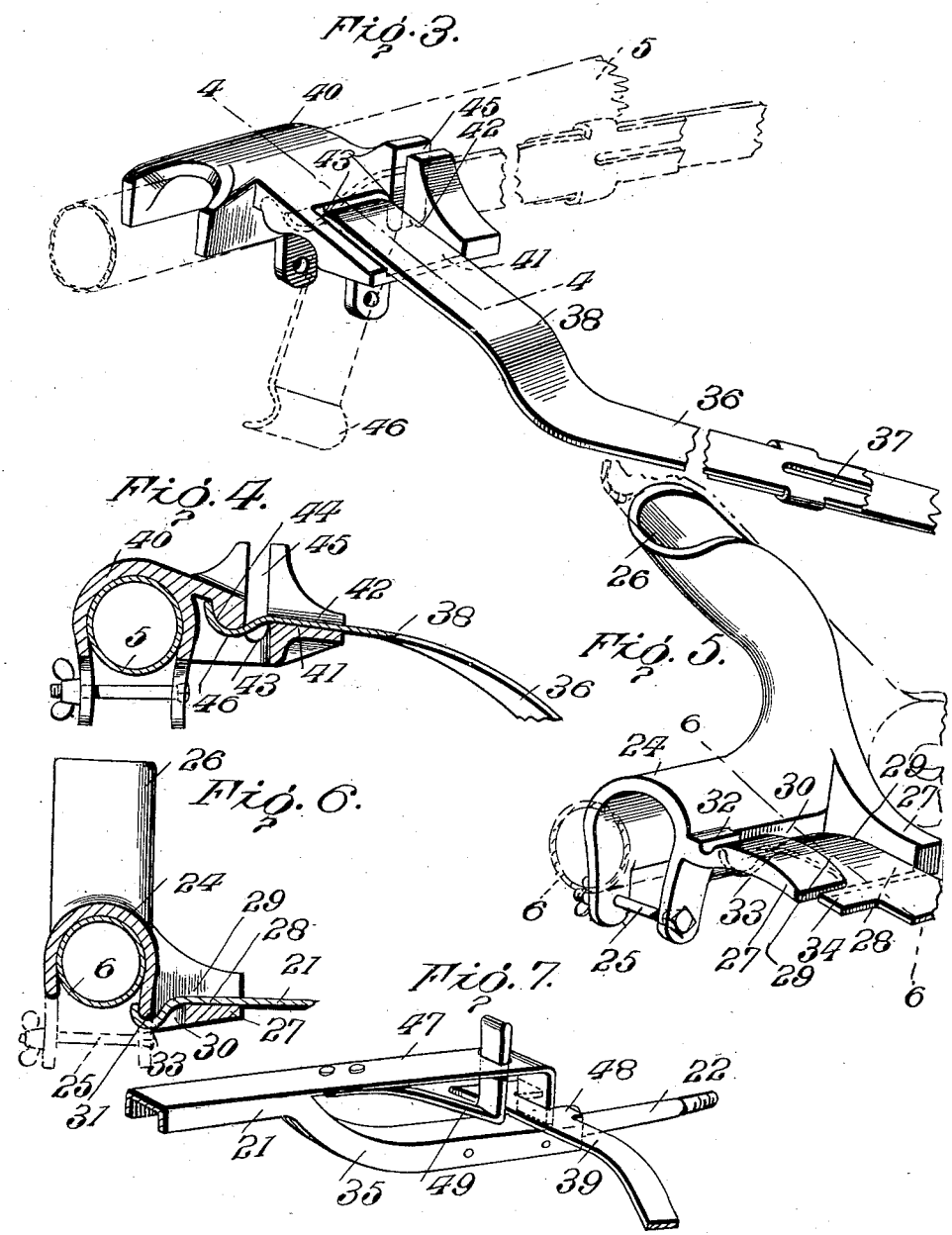

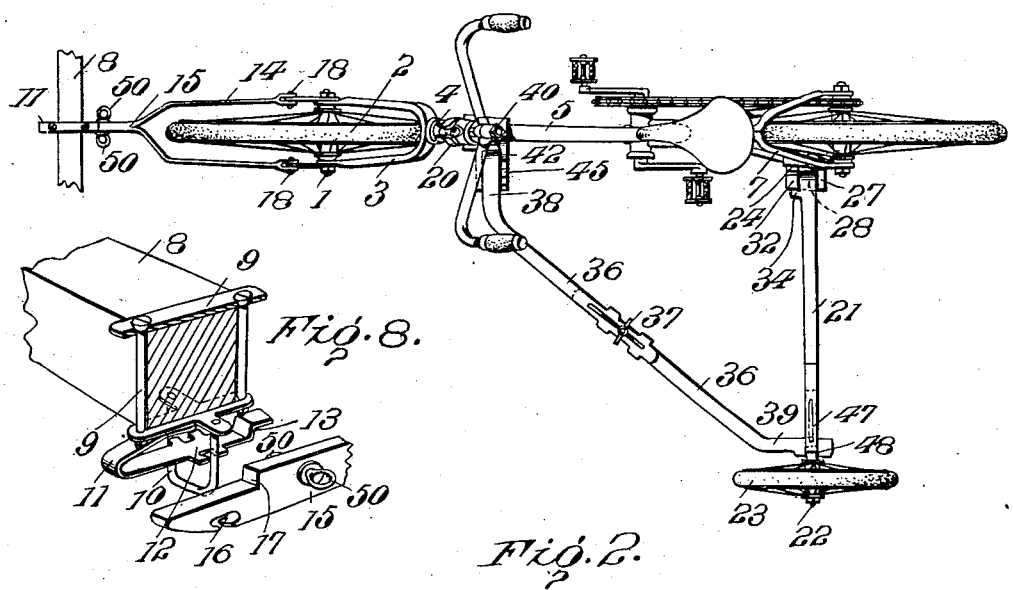

UNITED STATES PATENT OFFICE.

HUGH J. PHILLIPS, OF WASHINGTON, DISTRICT OF COLUMBIA.

BICYCLE ATTACHMENT.

No. 862,936.　　　Specification of Letters Patent.　　　Patented Aug. 13, 1907.

Application filed July 14, 1905. Serial No. 269,709.

*To all whom it may concern:*

Be it known that I, HUGH J. PHILLIPS, a citizen of the United States, residing at Washington city, District of Columbia, have invented certain new and useful Improvements in Bicycle Attachments; and I do hereby declare the following to be a full, clear, and exact description of the invention, such as will enable others skilled in the art to which it appertains to make and use the same.

This invention relates to certain improvements in bicycles and more particularly to improvements in bicycle attachments.

According to the methods now commonly followed in delivering vehicles from the livery stable or the garage to residences or elsewhere, the man delivering the vehicle is forced to waste considerable time in returning to the garage or stable by walking where the street cars are not convenient or carfare must be provided which will constitute an item of considerable expense where many vehicles are delivered.

It is an object of my invention to provide means whereby a bicycle can be coupled to the vehicle to be delivered and whereby the bicycle will trail behind the vehicle and be maintained in proper upright position, so that the delivery man can uncouple the bicycle from the vehicle when he has delivered the same, and utilize the bicycle for the purpose of quickly returning to the livery stable or garage.

A further object of the invention is to provide attachments whereby a bicycle can be easily coupled to a vehicle to trail behind the same and to be maintained in the proper upright position, and whereby the attachments can be, if so desired, folded out of the way or to the bicycle frame when the bicycle has been detached from the vehicle and is to be ridden.

A further object of the invention is to provide an attachment for bicycles comprising a supplemental third wheel frame adapted to hold the bicycle in an upright position when being towed or trailed behind a vehicle, said auxiliary or third wheel frame being loosely attached to the bicycle to fold up against the bicycle frame and capable of being readily removed from and applied to the bicycle.

A further object of the invention is to provide improved means for detachably coupling a bicycle to a vehicle so that the bicycle can be readily applied to the vehicle to trail behind and be drawn by the same and yet so as to be readily removable therefrom.

The invention consists in certain novel features of construction and in combinations and arrangements of parts as more fully and particularly described and pointed out hereinafter.

Referring to the accompanying drawings, which show what I now consider the preferred embodiment of my invention, as an example for purposes of explanation from among other constructions within the spirit and scope of invention;—Figure 1, is a top plan view of the bicycle showing my attachments applied thereto and in operative positions, a portion of the axle of the vehicle to which the bicycle is coupled, being shown. Fig. 2, is a side elevation of the construction shown in Fig. 1, the vehicle axle being shown in cross section, dotted lines indicating the positions assumed by the auxiliary or third wheel frame and the front coupling member when folded up to the bicycle frame. Fig. 3, is a detail perspective view of the clip and joint or coupling between the forwardly inclined connecting link or brace of the attachment and the front end of the top reach bar of the bicycle frame, dotted lines indicating the position assumed by said connecting link when the attachment is folded to the bicycle frame. Fig. 4, is a cross sectional view in the plane of the line 4—4, Fig. 3, through said top frame reach bar and the clip of Fig. 3, a portion of said link or brace being shown. Fig. 5, is a detail perspective view of the clip and coupling between the wheel arm of the attachment and the rear fork of the bicycle frame, a portion of the wheel arm being shown. Fig. 6, is a cross sectional view taken in the plane of the line 6—6, Fig. 5. Fig. 7, is a detail perspective view, parts being broken away and removed, of the joint or coupling between the outer ends of the axle or wheel arm and the connecting link or brace of the attachment, the parts being shown in operative position as shown in Fig. 1. Fig. 8, is a detail perspective view of a portion of the vehicle axle, showing the means for detachably locking thereto the coupling applied to the front fork of the bicycle, the front end or nose of said coupling being shown, separated from the axle. Fig. 9, is a detail side elevation of the nose of the coupling member showing the same attached to the vehicle axle shown in cross section, by a strap or flexible connection.

In the drawings, 1, is the axle of the bicycle front wheel 2, and 3, is the front fork of the bicycle to which said axle is secured.

4, is the bicycle head, and 5, is the top longitudinal reach bar of an ordinary diamond bicycle frame.

6, is the left hand leg of the rear fork of the bicycle frame, and 7, is the corresponding left hand upwardly extending brace bar of the frame from the rear end of the rear fork.

8, is the rear axle or other part of the running gear at the rear portion of an automobile, carriage or other vehicle.

Broadly considered, any suitable means can be provided to detachably couple the front portion of the bicycle with any suitable part or member at the rear of the vehicle, whether the vehicle be an automobile or a vehicle drawn by a horse, and so that the bicycle will be held to trail behind the vehicle and against objectionable lateral play or swerving.

In the particular example illustrated, merely for the purpose of explaining the features of my invention, I show a portion of the rear axle 8, of the vehicle provided with a clip 9, having a rigid depending loop 10, the opening through the loop being below the axle and transverse to the axis of the axle.

11, is a bowed or bent plate spring secured to the lower member of the clip 9, and forming a rearwardly extending downwardly pressing arm 12, extending through and beyond the loop 10, and at its rear end having a bend forming a rearwardly facing shoulder 13. If desired, this downwardly pressing spring arm 12 can be formed with side ears receiving the vertical legs of the loop 10, and serving to guide the spring arm 12 in its vertical movement.

14, is the coupling bar or member which in the present example, is shown attached to the ends of the axle 1, of the front bicycle wheel. This coupling bar or member is shown forked to receive the front bicycle wheel and to attach to both ends of the axle 1. The front end or nose 15 of the coupling member is formed to project through the loop 10, and is preferably beveled at its under surface to ride on the bottom cross bar of the loop 10, and intermediate the length of its under edge said nose 15 is provided with a notch or recess 16 to receive the bottom cross bar of the loop 10. This notch is preferably somewhat elongated about its entrance opening for the purpose of more securely maintaining the nose on the cross bar of the loop and against accidental release. The spring arm 12 bears down on the nose 15 and yieldingly holds the same to the bottom cross bar of the loop 10, and with said cross bar caught or confined in the notch 16. The nose 15 is preferably provided with a shoulder 17, to abut against the shoulder 13 of the spring arm 12 and thereby hold the nose against forward movement through the loop to prevent the nose riding forward through the loop. The nose 15 can be readily coupled to the part 8 by pressing the nose forwardly into the loop 10, against the tension of the spring 12 and until the loop 10, snaps into the notch 16. The nose 15 can be as easily uncoupled by pressing up to spring arm 12 so that the nose can be disengaged from the loop.

The rear ends of the legs of the forked coupling 14 are preferably clamped on the axle 1, and against the lower ends of the front fork 3 of the bicycle by the usual clamping nuts on the outer ends of the axle 1. The coupling member 14 is preferably provided with a knuckle or pivotal joint to permit the coupling to swing up out of the way to the head of the bicycle when the bicycle is to be used. For instance, I show each leg of the coupling member 14 composed of two sections pivotally united at 18, a short distance in advance of the axle 1, so that the forked coupling member 14, can swing vertically on the pivotal connections 18 from an upright position against the head of the bicycle to a forwardly extending approximately horizontal position for coupling with the vehicle. I preferably provide stop shoulders 19, at the pivotal joints or connections 18, to limit the downward movement of the coupling member 14 to prevent the nose thereof dropping down into engagement with the ground.

20 is a spring clamp or catch secured to the head of the bicycle to engage the forked coupling member 14 and detachably hold the same in the inoperative upright position and against the head of the bicycle. It will be observed that the coupling member is fastened to both legs or sides of the front fork of the bicycle and will hold the same comparatively rigid and against lateral movement, thereby forcing the bicycle, when coupled to a vehicle, to trail in proper position behind the vehicle and to be guided thereby.

I do not wish to limit my invention with respect to the coupling member applied to the front fork of the bicycle, to the particular means illustrated for detachably coupling said member to the axle or other part at the rear of the vehicle, as the front end of the coupling member can be variously formed or provided with various gripping or clamping means for detachable connection with any suitable part at the rear of the vehicle, to cause the bicycle to trail behind and be guided by the vehicle.

For the purpose of maintaining the frame of the bicycle and its rear wheel in the proper upright position, when coupled to and trailing behind a vehicle, I provide a third wheel or auxiliary frame attachment which can be dropped down into operative position when the bicycle is to be coupled to a vehicle, and which can be swung up out of the way approximately, against the bicycle frame when the rider desires to use the bicycle in returning after delivering the vehicle, or which can be readily detached from or applied to the bicycle. Various constructions can be employed for these purposes within the spirit and scope of my invention. In what I consider the preferred embodiment of my invention, I employ an axle arm or frame 21, at its inner end loosely and detachably coupled to the rear end or rear fork of the bicycle frame so that the arm can swing vertically from an inoperative vertical position against the frame of the bicycle and in rear of the saddle thereof to an outwardly extending horizontal operative position. The outer or free end of this arm forms or is provided with an axle stub 22, on which the comparatively small third wheel 23, is confined to rotate. When the arm 21 is in operative position, the wheel 23 is in a vertical position parallel with the rear wheel of the bicycle and a suitable distance therefrom. When in the operative position the wheel 23, is usually arranged opposite the left hand side of the rear wheel of the bicycle, and said third wheel 23 is usually of a diameter about equal to the radius of the rear wheel of the bicycle, although these dimensions are not essential.

As a means for coupling the third wheel frame or arm 21 to the rear portion of the bicycle frame, I show a U-shaped clip 24 fitted down on the rear portion of the left hand leg 6 of the rear fork of the bicycle frame and having depending ears through which a clamping bolt 25 passes beneath the said leg or tube 6, and by which said ears are drawn toward each other to clamp the clip on said tube. I preferably form this clip 24, with an upwardly extending U-shaped arm or leg 26 to fit and partially embrace the upwardly extending frame tube 7, for the purpose of bracing the clip 24 and holding the same against vertical rocking or oscillation on the frame tube 6. In other words, it will be observed that the members of the clip 24 are U-shaped in cross section and the clip is angular in form to fit in the angle of the frame formed by the frame tubes 6 and 7. I preferably form the clip of metal capable of bending or yielding so that the clip can be fitted to bicycle frames varying somewhat in size or angle at the meeting of the frame tubes 6 and 7. The horizontal portion of the clip 24 is provided with a lateral or outwardly projecting, about horizontal, flange or lug 27 formed with a transverse seat 28 having edge stop walls or shoulders 29 and at its inner end terminating in a slot 30 extending vertically through the lug or flange adjacent to the body or U-shaped portion of the clip 24, as more clearly shown in Fig. 6.

31, is a rib or depending flange forming a catch or shoulder at the inner side of the slot 30.

The lug or flange 27 is formed at its top surface and at one end of the slot 30 with a top seat or depression 32.

The inner end of the wheel arm or frame 21, is formed to extend transversely across the flange 27, and when in its normal position, to fit down in the seat 28, between the stop walls 29 which hold said arm 21 against horizontal movement. The inner end of the arm is provided with a downward deflection, bend or hook 33, which passes down through the slot 30 and under and in engagement with the depending rib 31, and up at the inner face of said rib so that the hook 33 holds the wheel arm 21 against outward movement from the clip 24, and the wheel arm is firmly held, when in operative position by pressing down on the seat 28 and by pressing up against the rib 31, and said arm is held in proper position at right angles to the longitudinal plane of the bicycle by the shoulders 29 and by the hook 33.

The arm 21 is provided with a lateral lug or projection 34 which abuts against the outer edge of the flange 27 when the arm 21 is in operative position (see Fig. 5), and when the arm 21 is swung upwardly the lug 34 rides on the top surface of the flange 27 to one side of the seat 28, and the hook 33, moves down from engagement with the rib 31, and the lug 34 drops into the seat or depression 32, thereby holding the arm 21 against dropping down through the slot 30. When the arm 21 is in this position, as shown by dotted lines in Fig. 2, the arm assumes an approximately vertical position with the wheel 23 in a horizontal position in rear of the bicycle saddle and with the lower end of the arm 21 depending through the slot 30. Suitable means can be provided to detachably hold the wheel arm or frame in this folded or inoperative position. It will be observed that the wheel arm or frame can be readily detached from the clip 24 by simply elevating the arm and lifting it out and clear of the slot 30 and the clip, and that the wheel arm can be as readily applied to the clip by inserting its hooked inner end into the slot of the clip.

The wheel arm can be formed of any suitable material although in the present instance, I show the same formed of a channel bar flattened at its inner end to form a portion to fit the seat 28 and to form the hook and lug hereinbefore mentioned. I show the outer end of the arm deflected downwardly or formed with an offset 35 (see Fig. 7) to lower the plane of the axis stub 22, and I show the axis stub 22 secured in the outer end of the channel bar by rivets or other suitable means.

Although it may not be always necessary to do so, and although I do not wish to limit all features of my invention thereto, yet as at present advised I prefer to provide an angularly arranged connecting link or brace for the wheel axle 21 thereby forming an approximately triangular auxiliary or third wheel frame. I show a connecting link or brace extending (when the third wheel frame is in operative position) from the outer end of the arm 21 upwardly and inwardly to the head or front end of the top reach bar 5, of the bicycle frame. This connecting link or brace 36 can be formed in two telescoping sections or sections sliding one on the other to render the link longitudinally adjustable. I show the two sections confined at their inner ends to slide one on the other and with means such as a longitudinal slot and nut and bolt 37 for clamping the sections together in the desired adjustment. The link 36 is provided with angularly arranged ends and is preferably straight between said ends. The upper end 38 of the link 36, extends inwardly or laterally and horizontally, when the link is in operative position, to throw the downwardly inclined portion of the link outwardly. At its lower end the link is bent to form the horizontal straight lower end 39, arranged at right angles to the length of the arm 21, when the auxiliary frame is in operative position. Suitable means are provided whereby the link 36 can swing vertically with the wheel arm 21 when the same is being folded to inoperative position, and whereby said link can be detached and attached readily to and from the bicycle frame. As a means which might be employed for this purpose, I show a U-shaped clip 40 to fit down on and partially embrace the top reach bar 5, and notched at its front end to partially embrace the bicycle head to prevent oscillation of the clip on the reach bar. The clip is formed with depending ears through which a bolt passes by which the clip is clamped on the reach bar as described in connection with the clip 24. Clip 40 formed is with a laterally projecting flange or lug having a depressed seat 41 for the end 38 of the connecting link, and the stop walls or shoulders 42 along the opposite edges of said seat to engage the longitudinal edges of the end 38 of the link. The inner end of the seat 41, terminates in the vertical slot 43 through said flange and at the inner side of said slot, the under surface of the flange is formed with a depending rib or shoulder 44 which is preferably transversely rounded to form an upwardly extending socket. At the rear end of the slot 43, the flange is formed with a vertical slot or socket 45 open at the top and closed at the bottom and arranged in the plane of the slot 43. The end 38 of the link 36 is formed flat to rest on and extend across the seat 41, when the third wheel frame is in operative position and the inner extremity of the end 38 is formed with the hook or downward deflection 46 to pass down through the slot 43, and under the rib 44 and upwardly at the inner side of said rib, thereby forming a hook which engages the rib to prevent outward movement of the link from the clip while the engagement of said arm 38 against the seat 41, and the rib 44, prevents downward movement of the link independently of the clip while the edge wall 42, holds the link against rearward movement, and holds the same to brace the arm 21. When the link 36 is swung upwardly the angle end 38 drops down through the slot 43 and depends from the clip, and when the link has been moved to a position where the end 38 is approximately vertical or perpendicular, the link is lowered so that the straight portion thereof enters the slot 45 with said straight portion in an approximately horizontal position and extending rearwardly beside the top reach bar 5 as shown by dotted lines in Figs. 2 and 3. The vertical seat or slot 45 holds the link in its inoperative or folded position and also serves to hold the arm 21 in its folded or inoperative position as more fully explained hereinafter. To restore the link 36 to operative position, it is raised until clear of the slot 45, and is then swung downwardly until its end 38 rests on the seat 41 and the hook 46 engages under the rib 44. It is obvious that the end of the link 36 can be readily disengaged and lifted from the clip 40 and can be as readily applied thereto, practically the same as described in connection with the arm 21 and the clip 24.

I preferably detachably couple together the outer end of the wheel arm 21, and the rear end 39 of the link 36 to permit detachment of the link from the arm if necessary and to permit the link to move rearwardly independently of the arm as the arm and link are swung upwardly to inoperative or folded position. As a means which can be employed for this purpose, I show the outer end of the arm 21, formed with an eye or loop by a bent piece 47, secured to the arm 21 to form the eye or loop in conjunction with the offset 35 so that the eye or loop is arranged along the upper side of the depressed outer end of the arm 21. The flat end 39 of the link extends through this eye or loop and rests on the upper side of the arm 21. At its outer edge, the end 39 is formed with a notch 48 of a size to snugly receive the depending or angular end of the metal bar or plate 47 for the purpose of locking the ends of arm 21 and link 36, together in operative position so that the link braces the arm against the rearward strain.

49, is a spring stop secured to the plate 47 and having a bent end extending upwardly through an opening in the plate 47. This spring 49 constantly tends to press downwardly against the depressed portion of the arm 21 forming the bottom of the loop or eye so that its upwardly extending end forms the stop holding the end 39 of the brace in operative position with the notch 48 receiving the bent end of the plate 47, as clearly illustrated by Fig. 7. When it is desired to fold up the third wheel frame, the spring 49, is pressed upwardly to free the brace end 39, permitting said brace end to drop behind the spring 49, so that as the arm 21 is swung upwardly the brace or link 36 will slide rearwardly through the loop or eye, and when the arm 21 reaches the vertical position, see Fig. 2, the bent end 39 of brace or link 36 will be located behind the arm with the brace or link projecting through said loop. The parts will be held in this position, as hereinbefore described, by the brace or link resting in the locking slot or socket 45 of the front clip. As the arm 21 is swung downwardly to operative position, after the brace or link 36, has been released from slot 45, said link slides forwardly through the loop of the arm, and when the arm has assumed its normal operative position, the end 39 of the link is pressed outwardly so as to slip under and past the spring 49 which will snap down behind the end 39, and thereby hold said end with the angle end of the plate 47, in the notch 48.

The nose 15, of the coupling member is formed with eyes or loops 50, so that a strap or flexible connection 51, (see Fig. 9) can be wrapped around the vehicle axle or any other suitable part of the vehicle and have its ends attached to loops 50: For instance this strap can have end snap hooks to engage the loops 51. The coupling member can thus be secured to the vehicle where the loop 10 is not provided. The strap 51 can also serve to secure the coupling member folded to the bicycle head so that spring clamp 20, can be dispensed with.

It is evident that various modifications and changes might be resorted to in the forms, constructions and arrangements of the parts described, and that elements might be omitted or elements added without departing from the spirit and scope of my invention, and hence I do not wish to limit myself to the exact constructions shown.

What I claim is:—

1. A third wheel attachment for a bicycle comprising a wheel arm provided with the third wheel, and means for detachably and loosely coupling said arm to the bicycle frame and for holding the same in operative and inoperative positions, whereby the arm can be swung to a vertical inoperative position beside the bicycle frame and can be dropped to the operative horizontal position, and whereby the arm can be readily removed from and attached to the bicycle frame.

2. A third wheel attachment for a bicycle comprising a vertically swingable wheel arm at its outer end provided with the third wheel and a clip for attachment to the bicycle frame, the inner end of said arm being loosely and detachably coupled to the clip, and means for holding said arm in lowered operative position, and for holding said arm in vertical inoperative position.

3. A third wheel attachment for a bicycle comprising a vertically swingable third wheel frame provided with the third wheel and adapted to swing up to the bicycle frame in inoperative position, and means for attaching said frame to the bicycle and for locking the same in operative and inoperative positions, said frame being detachably and loosely coupled to said means.

4. A third wheel attachment for a bicycle adapted to swing up to inoperative position and comprising a wheel arm provided with the third wheel, a connecting link or brace having a sliding connection with said arm, means for locking together said link and the arm to hold the arm in operative and inoperative positions, and means for securing the link and arm to the bicycle frame and for holding the link in inoperative position, the link and arm being loosely coupled with said means.

5. A bicycle provided with a vertically swingable third wheel attachment, a swingable slidable link for holding the same in operative and inoperative positions, and means attaching the same to the bicycle.

6. A bicycle provided with a vertically swingable third wheel attachment comprising a wheel arm provided with the third wheel, and means whereby said arm can swing from the operative lowered position to a vertical position against the bicycle frame in rear of the saddle and for locking said arm in said position.

7. A bicycle provided with a vertically movable third wheel attachment comprising a wheel arm provided with the third wheel, a connecting link or brace, means loosely coupling said link to the outer end portion of said arm, and means whereby said arm can swing to the vertical inoperative position against the bicycle frame and said link can move to the inoperative position extending rearwardly and horizontally from the front portion of the bicycle frame to said arm.

8. A third wheel attachment for bicycles comprising a wheel arm provided with the third wheel and having a bent or hooked inner end, and a clip for attachment to the bicycle frame and formed with a slot and shoulders to detachably receive the inner end of said arm and to support the same in the outwardly extending operative position and in the upwardly extending folded or inoperative position.

9. A third wheel attachment for bicycles comprising a vertically swingable wheel arm at its outer end provided with the third wheel, a connecting link or brace passing loosely and transversely across the outer end of said arm, spring means for detachably locking said arm and link together when in operative position, clips for attachment to the front and rear portions of the bicycle, and means whereby the front end of said link detachably and loosely couples and interlocks with one of said clips and whereby the inner end of said arm detachably and loosely couples and interlocks with the other clip.

In testimony whereof I affix my signature, in presence of two witnesses.

HUGH J. PHILLIPS.

Witnesses:
J. D. YOAKLEY,
JNO. IMIRIE.